United States Patent
Nicholson et al.

(10) Patent No.: US 7,844,146 B2
(45) Date of Patent: Nov. 30, 2010

(54) ALL-FIBER MODULE FOR FEMTOSECOND PULSE COMPRESSION AND SUPERCONTINUUM GENERATION

(75) Inventors: Jeffrey W. Nicholson, Morristown, NJ (US); Andrew D. Yablon, Livingston, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/150,692

(22) Filed: Apr. 30, 2008

(65) Prior Publication Data

US 2009/0274180 A1 Nov. 5, 2009

(51) Int. Cl.
*G02B 6/32* (2006.01)
*H01S 3/00* (2006.01)
*H01S 3/13* (2006.01)

(52) U.S. Cl. ............ 385/33; 385/1; 385/2; 385/3; 385/15; 385/122; 385/123; 385/124; 385/141; 359/341.3; 372/30

(58) Field of Classification Search ............ 359/341.3; 372/30; 385/122–124, 127, 14–15, 27–28, 385/31–33, 141, 1–3
See application file for complete search history.

(56) References Cited

U.S. PATENT DOCUMENTS

| | | | |
|---|---|---|---|
| 4,560,247 A * | 12/1985 | Aldebert | 385/124 |
| 4,701,011 A * | 10/1987 | Emkey et al. | 385/34 |
| 5,712,937 A * | 1/1998 | Asawa et al. | 385/49 |
| 6,081,543 A | 6/2000 | Liu et al. | |
| 6,249,630 B1 | 6/2001 | Stock et al. | |
| 6,542,665 B2 | 4/2003 | Reed et al. | |
| 6,549,702 B2 * | 4/2003 | Islam et al. | 385/31 |
| 6,650,466 B1 | 11/2003 | Wise et al. | |
| 6,775,447 B2 * | 8/2004 | Nicholson et al. | 385/122 |
| 6,970,624 B2 | 11/2005 | DiGiovanni et al. | |
| 6,990,270 B2 * | 1/2006 | Nicholson | 385/27 |
| 7,013,678 B2 | 3/2006 | DiGiovanni et al. | |

(Continued)

FOREIGN PATENT DOCUMENTS

EP 1764885 3/2007

(Continued)

OTHER PUBLICATIONS

Emkay et al., "Analysis and Evaluation of Graded-Index Fiber Lenses", Journal of Lightwave Technology, vol. LT-5, No. 9 Sep. 1987, pp. 1156-1164.

(Continued)

*Primary Examiner*—Brian M. Healy
*Assistant Examiner*—Guy G Anderson

(57) ABSTRACT

An all-fiber optical pulse compression arrangement comprises a concatenated arrangement of a section of input fiber (e.g., a single mode fiber), a graded-index (GRIN) fiber lens and a section of pulse-compressing fiber (e.g., LMA fiber). The GRIN fiber lens is used to provide mode matching between the input fiber (supporting the propagation of chirped optical pulses) and the pulse-compressing fiber, with efficient pulse compression occurring along the length of the LMA fiber. The dispersion and length of the LMA fiber section are selected to provide the desired degree of pulse compression; for example, capable of reconstituting a femtosecond pulse as is used in supercontinuum generation systems.

9 Claims, 5 Drawing Sheets

U.S. PATENT DOCUMENTS

| | | | |
|---|---|---|---|
| 7,116,874 | B2 | 10/2006 | Brown et al. |
| 7,171,089 | B2 | 1/2007 | Feder et al. |
| 7,228,029 | B1 * | 6/2007 | Ramachandran et al. ...... 385/28 |
| 7,340,135 | B2 * | 3/2008 | Okuno ........................ 385/122 |
| 7,340,138 | B1 * | 3/2008 | Yablon et al. ................ 385/124 |
| 7,426,328 | B2 * | 9/2008 | Zhou et al. ................... 385/124 |
| 7,430,224 | B2 * | 9/2008 | Liu et al. ......................... 372/6 |
| 7,508,853 | B2 * | 3/2009 | Harter et al. ................... 372/30 |
| 2002/0012498 | A1 | 1/2002 | Danziger |
| 2002/0150333 | A1 | 10/2002 | Reed et al. |
| 2003/0156605 | A1 | 8/2003 | Richardson et al. |
| 2004/0042714 | A1 | 3/2004 | Ramachandran |
| 2005/0265653 | A1 | 12/2005 | Cai et al. |
| 2006/0227816 | A1 | 10/2006 | Liu |
| 2006/0233554 | A1 | 10/2006 | Ramachandran et al. |
| 2007/0177640 | A1 | 8/2007 | Liu |
| 2007/0177641 | A1 | 8/2007 | Liu |
| 2007/0206647 | A1 | 9/2007 | Liu |
| 2008/0180787 | A1 * | 7/2008 | DiGiovanni et al. ......... 359/334 |

FOREIGN PATENT DOCUMENTS

| | | |
|---|---|---|
| GB | 2260048 | 3/1993 |
| WO | WO 2005/041367 | 5/2005 |
| WO | WO 2006/027298 | 3/2006 |

OTHER PUBLICATIONS

Chanclou et al., "Expanded Single-Mode Fiber Using Graded Index Multimode Fiber", 2004 Society of Photo-Optical Intrumentation Engineers, Jul. 2004, pp. 1634-1642.

Nicholson et al. "Cross-Coherence Measurements of Supercontinua Generated in Highly-Nonlinear, Dispersion Shifted Fiber at 1550 nm", Optics Express, Feb. 23, 2004, vol. 12, No. 4.

Shiraishi et al.,"Spotsize Contraction in Standard Single-Mode Fibers by Use of a GI-Fiber Tip with a Hight Focusing Parameter" IEEE Photonics Tech. Letters, vol. 10, Dec. 1998.

Galvanauskas, "Mode-Scalable Fiber-Based Chirped Pulse Amplification Systems", IEEE Journal on Selected Topics In Quantum Electronics, Jul./Aug. 2001.

Chanclou et al. "Design and Performance of Expanded Mode Fiber using Microoptics", Journal of Lightwave Technology vol. 29, No. 5, May 2002.

Ramachandran et al, "Robust, Single-Moded, Broadband Transmission and Pulse Compression in a Record Aeff (2100 Micrometre 2) Higher-Order-Mode Fiber" Proceedings of the European Conference on Optical Communication, vol. 6, Jan. 1, 2005, pp. 37-38.

Itoh, et al, "Femtosecond Pulse Delivery Through Long Multimode Fiber Using Adaptive Pulse Synthesis", Japanese Journal of Applied Physics, Part 1 Japan Soc. Appl. Phys Japan vol. 45, No. 7, Jul. 2006, pp. 5761-5763.

* cited by examiner (a)

(b)

ALL-FIBER MODULE FOR FEMTOSECOND PULSE COMPRESSION AND SUPERCONTINUUM GENERATION

TECHNICAL FIELD

The present invention relates to an arrangement for providing pulse compression (and subsequent continuum generation) at the output of a femtosecond laser source and, more particularly, to an all-fiber compression arrangement utilizing a graded-index fiber lens disposed between a first fiber section (for propagating incoming chirped pulses) and a second fiber section (for compressing the chirped pulses).

BACKGROUND OF THE INVENTION

Fiber lasers with high pulse energy, good beam quality and excellent optical characteristics have applications in many fields and industries, such as analytical spectroscopy (e.g., fluorescence, absorption), illumination, remote sensing and environmental spectroscopy (e.g., wind speed, biohazards, eco-system mapping, etc.), ranging and targeting (e.g., collision avoidance, military applications, etc.) and scientific instrumentation. Fiber lasers with exceptionally short pulse widths, for example, femtosecond fiber lasers, have special applications in these and other fields.

There has been great progress in developing short pulse fiber lasers. One approach is to use nonlinearity during amplification in the wavebreaking-free regime of normal dispersion amplifiers to generate a chirped pulse. Pulse compression can then be performed in a coupled section of single mode fiber. U.S. Pat. No. 6,990,270 issued on Jan. 24, 2006 to J. Nicholson and assigned to the assignee of this application is exemplary of this type of arrangement. However, one of the difficulties associated with femtosecond pulses in fibers is compressing the high energy pulses. Nonlinearities in the fiber create distortions in the spectrum, causing the pulse to lose energy to undesirable pedestals or, worse, break up into multiple satellite pulses.

Often, "stretched" pulse amplification is implemented, where the ultrashort pulse is first stretched in the time domain by many orders of magnitude, temporally broadening the pulse and decreasing the peak power. The stretched pulse is then amplified, eliminating or reducing the nonlinear interactions present when attempting to amplify femtosecond pulses. However, whether using a similariton-type amplifier, or stretched pulse amplification, the chirped, amplified output pulse must ultimately be re-compressed, where the high pulse energies associated with amplification means that the recompression stage is usually done using bulk optics.

A fiber that is capable of propagating and compressing high energy femtosecond pulses would then be desirable for two reasons. First, if the fiber can be designed with an appropriate dispersion, it could serve as a compression stage for stretched, high energy pulses. Second, if the compression function can be implemented in a fiber, it can also serve as a delivery fiber for ultrashort pulses for a wide variety of applications, as mentioned above.

SUMMARY OF THE INVENTION

The need remaining in the prior art is addressed by the present invention which relates to an arrangement for providing pulse compression at the output of a chirped femtosecond pulse source and, more particularly, to an all-fiber compression arrangement utilizing a graded-index fiber lens disposed between a first fiber section (for propagating incoming chirped pulses) and a second fiber section (for compressing the chirped pulses). The fibers are selected such that the effective area of the pulse-compressing fiber (denoted $A_{eff-2}$) is greater than the effective area of the input fiber (denoted $A_{eff-1}$) at the system wavelength. In one embodiment, the pulse-compressing fiber may comprise a section of a large-mode area (LMA) fiber, with the input fiber comprising a section of standard single mode fiber.

In accordance with the present invention, a fiber-based graded-index lens is disposed between a fiber exiting a pulse stretching unit and a section of pulse-compressing fiber. The graded-index fiber lens (i.e., GRIN lens) comprises a section of fiber with a radially-dependent profile index profile (for example, a parabolic index profile) and a length appropriate to form a quarter-pitch lens (or any odd multiple thereof). Often the GRIN fiber lens is formed from a short section of multi-mode fiber. The GRIN fiber lens thus provides matching of the modefield diameters between the input fiber and the pulse-compressing fiber in a preferred "all-fiber" arrangement. The dispersion (positive) and length of the pulse-compressing fiber are selected to provide the desired degree of pulse compression; for example, capable of reconstituting a femtosecond pulse train as is used in supercontinuum generation systems.

The utilization of an all-fiber pulse compression arrangement eliminates the need for bulk optic components. Therefore, the transmission losses associated with the in-line arrangement are considerably less than those found in prior art pulse compression arrangements using bulk components.

In a further embodiment of the present invention, the pulse-compressing fiber may be coupled to a further section of transmission fiber (using, preferably, a second GRIN fiber lens to provide matching of modefield diameters), to deliver the amplified femtosecond optical pulse train to its intended application. In one particular embodiment, a section of highly-nonlinear fiber (HNLF) may be coupled to the pulse-compressing fiber and create a supercontinuum from the generated pulse train of femtosecond pulses.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
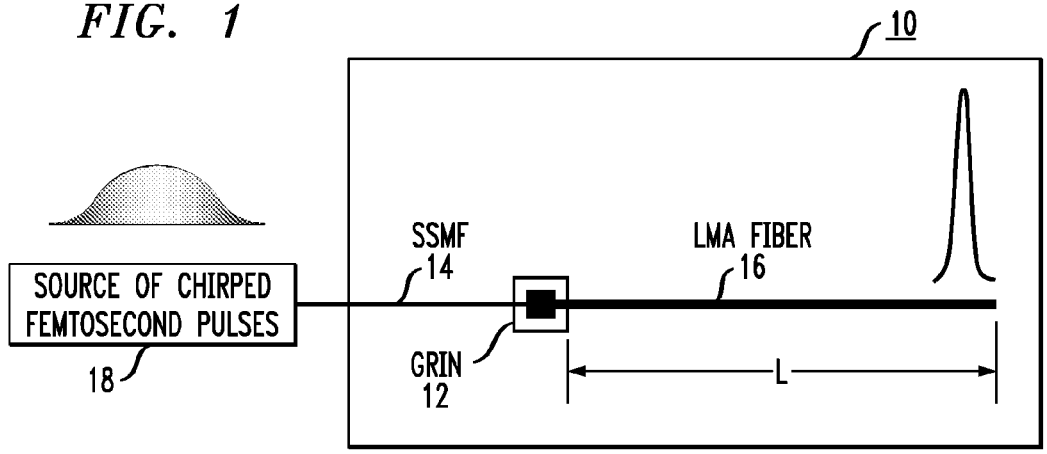
FIG. 1 illustrates an all-fiber pulse compression arrangement formed in accordance with the present invention.

FIG. 1 illustrates an exemplary all-fiber femtosecond pulse compressor 10 formed in accordance with the present invention. As shown, compressor 10 comprises a graded index (GRIN) fiber lens 12 disposed between an input fiber 14 and a section of pulse-compressing fiber 16. Fibers 14 and 16 are selected such that the effective area of fiber 14 (denoted as $A_{eff\text{-}1}$) is less than the effective area of fiber 16 (denoted as $A_{eff\text{-}2}$) at the operating wavelength. A source of 'stretched' femtosecond pulses 18 (alternatively referred to in the art as 'chirped' pulses), formed in a manner well-known in the prior art, is shown in conjunction with compressor 10 in FIG. 1. Source 18 is used to create a train of chirped pulses P which is thereafter coupled into input fiber 14. As discussed above, ultrashort pulses (on the order of 100 femtoseconds, for example) may first be stretched in the time domain by many orders of magnitude, temporally broadening the pulse and decreasing the peak power to essentially eliminate (or at least reduce) nonlinear interactions during amplification.

Optical pulse compressor 10 of the present invention may be utilized after amplification to re-compress the pulses into their original temporal form. In particular, GRIN fiber lens 12 is used to provide a high quality coupling from the output of input fiber 14 into pulse-compressing fiber 16 by performing mode-matching between the two fibers. Pulse-compressing fiber 16 is selected to exhibit a known (positive) dispersion characteristic D at the operating wavelength, and is formed to exhibit a predetermined length L that has been found to provide the desired amount of pulse compression (e.g., to form femtosecond pulses). Thus, the output from pulse-compressing fiber 16 (i.e., the output from optical pulse compressor 10) is a train of amplified femtosecond pulses. It is to be noted that the length L of fiber 16 must be selected so as to compensate for the spectral phase of the launched pulse. This length consideration, which is based on the dispersive properties of the selected pulse-compressing fiber, is generally not a consideration in typical high power pulse amplifiers, but is considered to be an essential aspect of the arrangement of the present invention, and necessary to provide pulse compression with the desired linear properties.

Advantageously, the inclusion of GRIN fiber lens 12 between fibers 14 and 16 eliminates the need for a bulk optic device, as was used in the prior art, to couple the pulses into the pulse-compressing fiber. Bulk optics are known to introduce loss, scattering, reflections and the like, all reducing the quality of the signal launched into the pulse-compressing fiber. In contrast, the use of a fiber-based component such as GRIN fiber lens 12 significantly reduces the various coupling losses and allows for the launched pulses to achieve low levels of multi-path interference (MPI) and low nonlinearity compression in LMA fiber 16.

Additionally, the use of an in-line fiber coupling arrangement eliminates the alignment problems associated with the use of bulk optics, since permanent alignment between the GRIN fiber lens and the pulse-compressing fiber is automatically achieved when the two are fused together (see, for example, U.S. Pat. No. 4,701,011 for a discussion of self-alignment between transmission fibers and GRIN fiber lenses). Another advantage of using an in-line coupling arrangement is the intrinsic isolation of the optical signal path from dust or other extrinsic contaminants, as may be found in bulk optic solutions.

Figure 2:
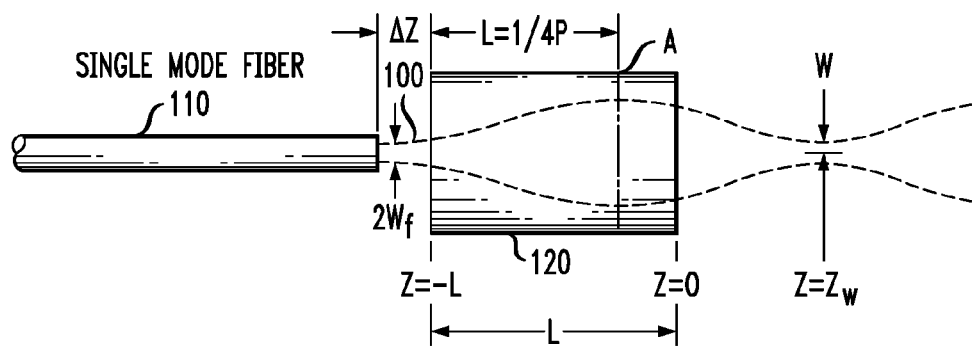
FIG. 2 is a diagram illustrating the basic principles of a graded-index fiber lens.
Figure 3:
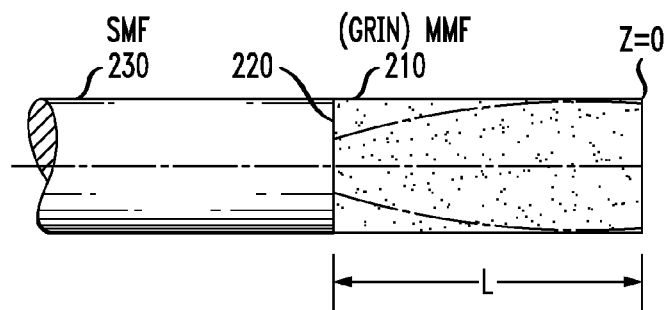
FIG. 3 illustrates an exemplary fiber lens arrangement as used in the pulse compression arrangement of the present invention.

The ability to use a fiber-based GRIN lens to provide mode coupling between input fiber 14 and pulse-compressing fiber 16 is, therefore, a critical component of the present invention. FIG. 2 contains a basic diagram illustrating the principles associated with the implementation of a graded-index fiber lens. In particular, FIG. 2 illustrates a Gaussian beam 100 exiting a single mode fiber 110 and thereafter passing through a parabolic-index medium 120, which is preferably a section of multimode fiber. The waist position and beam size associated with Gaussian beam 100 may be found from equations well-known in the art. In order to provide mode-matching into the pulse-compressing fiber, as desired in the arrangement of the present invention, beam 100 should achieve maximum expansion at Z=0, the exit of parabolic-index medium 120. Thus, medium 120 should comprise a length L equal to π/2 g, where g is the focusing parameter of medium 120. These parameters result in the formation of a device commonly referred to in the art as a "quarter pitch" lens (or, in general, any odd multiple thereof). FIG. 3 illustrates an exemplary fiber-lens arrangement providing this maximum expansion suitable for mode matching, showing a section of multimode fiber 210, of length L, fused to endface 220 of a section of single mode fiber 230. As shown, the length L is associated with the Z=0 point of maximum expansion.

It is to be understood that this discussion of a "parabolic index" embodiment is exemplary only, and for the purposes of explanation, not limitation, since a graded-index fiber lens formed in accordance with the present invention may utilize any refractive index gradient that is capable of achieving mode-matching between the single mode fiber and the large mode area fiber.

Figure 4:
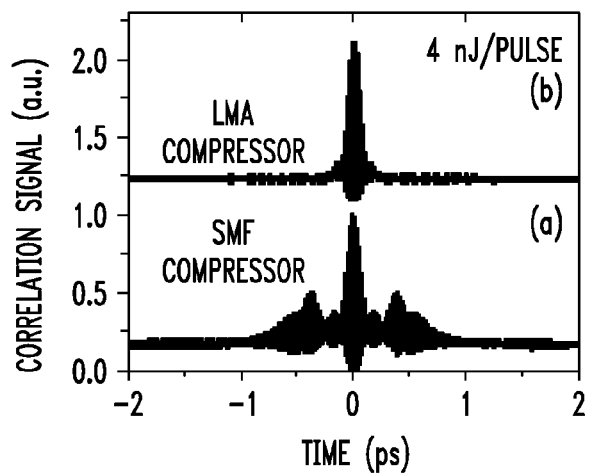
FIG. 4 contains graphs of pulse shape at the output of a pulse compressor, with the graph of FIG. 4(a) associated with a prior art pulse compression arrangement using single mode fiber and the graph of FIG. 4(b) associated with the inventive pulse compression arrangement using a section of large-mode area fiber.

FIG. 4 contains graphs illustrating the improvement in compressed pulse shape that may be achieved when using the GRIN lens fiber/pulse-compressing fiber arrangement of the present invention, as compared to the prior art use of only a section of single mode fiber. The plot of FIG. 4(a) shows the autocorrelation function associated with a compressed pulse train created using only a section of single mode fiber (prior art). The original 'stretched' pulses were generated by amplifying the output of a passively mode-locked fiber laser. The combination of normal dispersion and self-phase modulation in the single-mode, erbium-doped fiber amplifier creates pulses with a strong negative chirp.

To create the results shown in FIG. 4(a), the output section of single mode fiber (performing the compression function) was continually reduced in length until the shortest pulse output was found. In this case, for a 4 nJ pulse, compression in single mode fiber is shown to include significant sidelobes in the autocorrelation function; expected as a result of the inherent nonlinearity of the single mode fiber.

In contrast, the plot of FIG. 4(b) shows the autocorrelation function of output pulses from an all-fiber pulse compressor formed in accordance with the present invention. For this particular embodiment, a section of large-mode area (LMA) fiber was used as the pulse-compressing fiber. The LMA fiber was selected to exhibit an effective area $A_{eff-2}$ of 986 µm² at the operating wavelength of 1550 nm, with a dispersion of +21.08 ps/nm-km and a dispersion slope of 0.063 ps/nm²-km. The positive dispersion value at the operating wavelength compensates for the normal dispersion of the amplifier fiber, as well as the additional nonlinear phase due to self-phase modulation during amplification in single mode fiber. As shown, the generated autocorrelation function exhibits essentially no sidelobes, indicative of the elimination of nonlinearities in the all-fiber pulse compression arrangement of the present invention.

Figure 5:
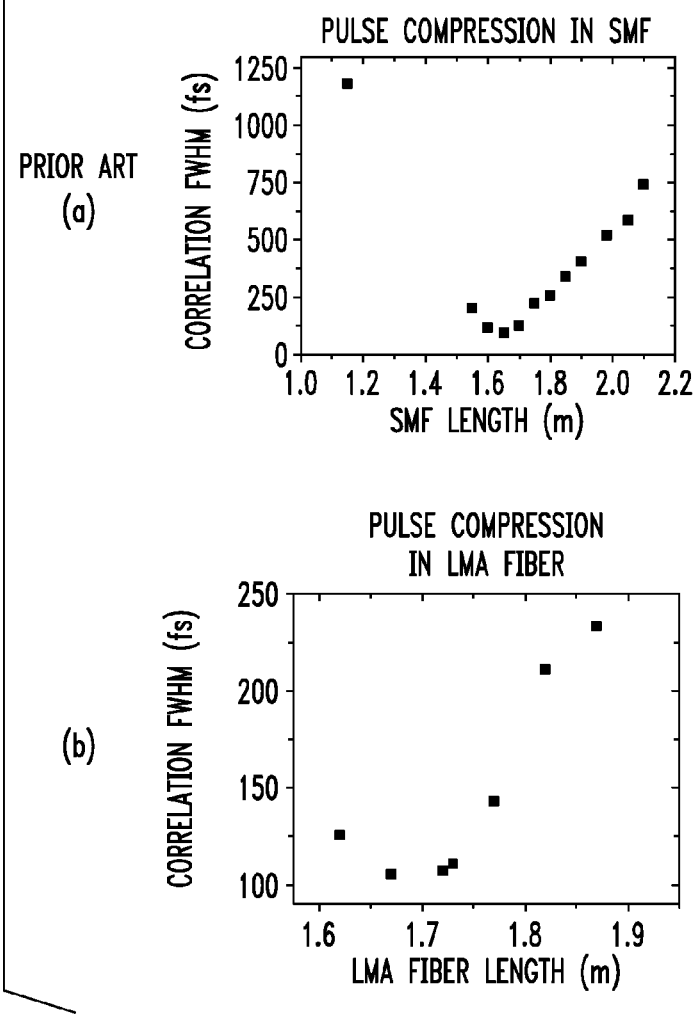
FIG. 5 contains plots of the measured pulse correlation width as a function of the length of the fiber section used to perform the pulse compression, with the plot of FIG. 5(a) associated with various lengths of single mode fiber (prior art) and the plot of FIG. 5(b) associated with various lengths of pulse-compressing fiber of the present invention.

As mentioned above, the dispersion and length of the section of the fiber used to provide pulse compression are critical factors in determining the amount of pulse compression that may be achieved. The plots of FIG. 5 illustrate the pulse width correlation as a function of the length of the compression fiber. FIG. 5(a) illustrates this correlation as a function of fiber length for a prior art pulse compressor using single mode fiber, and FIG. 5(b) shows the same correlation as a function of length for an exemplary LMA fiber used the pulse-compressing fiber in an exemplary embodiment of the present invention. Referring to FIG. 5(b), the correlation is seen to achieve a minimal value of about 100 fs for a length L of about 1.7 m, with an accuracy of approximately 5 cm required to achieve the minimum pulse width. A similar accuracy and fiber length is also required for pulse compression in prior art arrangements using single mode fiber; however, as discussed above, nonlinearity in the single mode fiber causes the generation of significant wings in the autocorrelation. Thus, the arrangement of the present invention is seen to provide a more faithful reproduction of the original femtosecond pulses than could be achieved by using only single mode fiber. One of ordinary skill in the art will recognize that the use of ultrashort pulses, by nature of the Fourier Transform relation between time and frequency, requires that the device operate over a broad bandwidth. For example, FIG. 5a shows a pulse centered at 1550 nm with a width on the order of 1 ps, which, if transform limited, would require a spectrum with a bandwidth (full-width at half-maximum) of approximately 2.5 nm. Chirped pulses, or transform limited pulses with shorter widths would require even more bandwidth.

Figure 6:
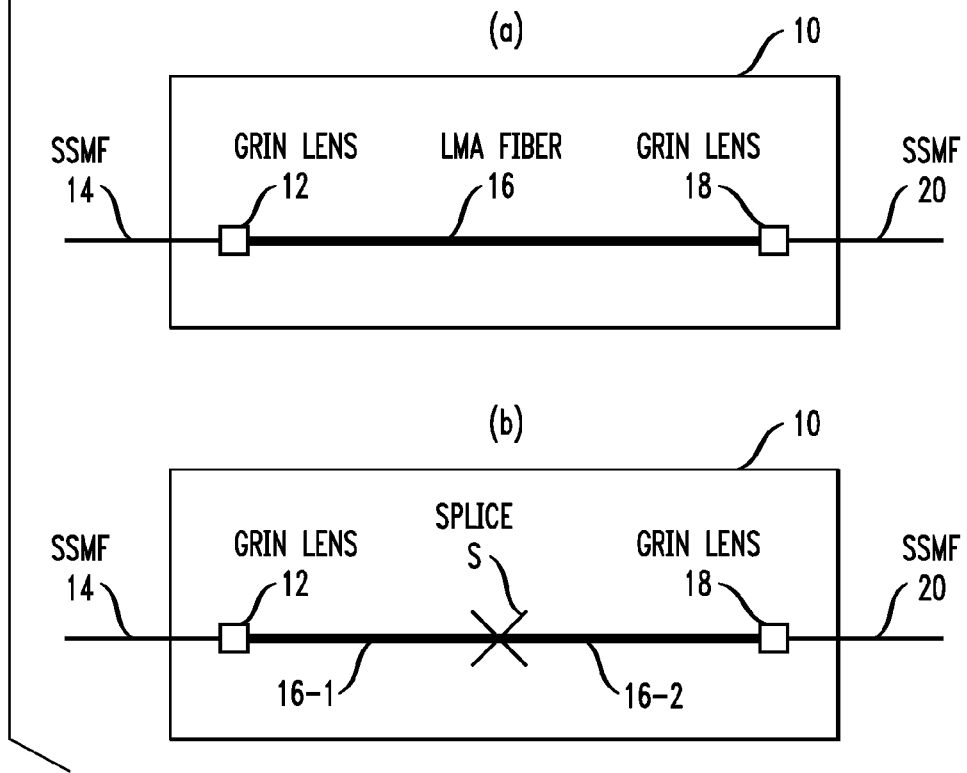
FIG. 6 illustrates an alternative embodiment of the present invention, including an output GRIN fiber lens coupled to the output of the pulse-compressing fiber, the arrangement of FIG. 6(a) using a single section of fiber and the arrangement of FIG. 6(b) using a concatenated pair of fibers spliced together.

If the compressed output pulses from the arrangement of the present invention are to be thereafter propagated along a transmission fiber (which is likely for medical applications, sensing applications, etc.), a preferred embodiment in accordance with the present invention includes the use of a second GRIN lens between the output of the pulse-compressing fiber and a transmission fiber to provide efficient mode matching between the compression arrangement and the transmission arrangement. FIG. 6 illustrates this embodiment of the present invention, providing a fully all-fiber pulse compression and transmission system.

FIG. 6(a) shows a first arrangement where a second GRIN lens 18 is disposed between the endface of pulse-compressing fiber 16 and a single mode output transmission fiber 20. Preferably, second GRIN lens 18 is fused between fibers 16 and 20, since fusion provides automatic alignment between the core regions of the various fibers. As with the properties of GRIN lens 12 discussed above, second GRIN lens 18 is formed to have a length L' suitable for providing mode-matching between pulse-compressing fiber 16 and SMF 20. The alternative arrangement as shown in FIG. 6(b) includes two separate sections of pulse-compressing fiber, shown as 16-1 and 16-2, with a splice formed therebetween to couple the fibers together.

Figure 7:
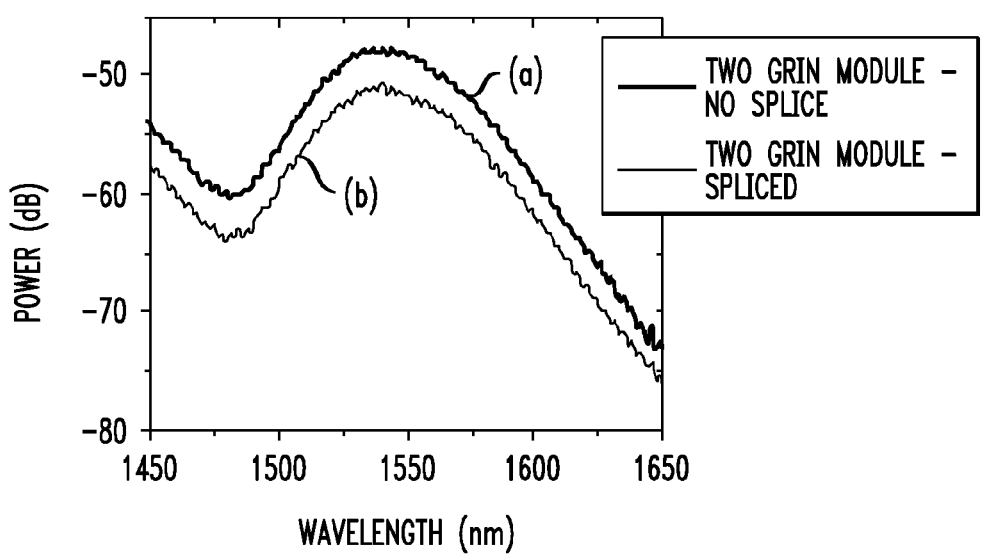
FIG. 7 contains plots of the measured spectra associated with the arrangements of FIGS. 6(a) and 6(b)

Multi-path interference (MPI) is a measure of the mount of light in undesired, higher-order modes and is defined as follows:

$$MPI=10*\log(P_{HOM}/P_F),$$

where $P_{HOM}$ is the total optical power propagating in undesired higher-order modes of the compressed fiber, and $P_F$ is the optical power in the fundamental mode. FIG. 7 contains plots of the measured spectra for the arrangements of FIGS. 6(a) and (b). The measured MPI of the arrangement of FIG. 6(a) was −31 dB, and the MPI for the spliced arrangement of FIG. 6(b) was −26 dB, showing the majority of the power is contained in the desired fundamental mode. Achieving low MPI is important for a number of reasons. First, large amounts of energy in undesired higher-order-modes can lead to signal power fading as the phase between coherent modes drifts. Additionally, MPI can potentially lead to increased noise of the compressed pulses are to be used in further nonlinear processes such as supercontinuum generation.

Given this ability to couple the femtosecond pulses into an output single mode fiber via a second GRIN lens, it is further possible to thereafter couple a section of highly nonlinear fiber (HNLF) to the second GRIN lens (or alternatively, the section of output signal mode fiber) to form an "all-fiber" arrangement for supercontinuum generation. As described in various prior art references, including U.S. Pat. No. 6,775, 447 (Nicholson et al., assigned to the assignee of this application), the propagation of extremely short pulses (such as femtosecond pulses) through one or more sections of HNLF will generate a continuum of extremely broad bandwidth, useful in frequency metrology and other applications (such as DWDM).

Figure 8:
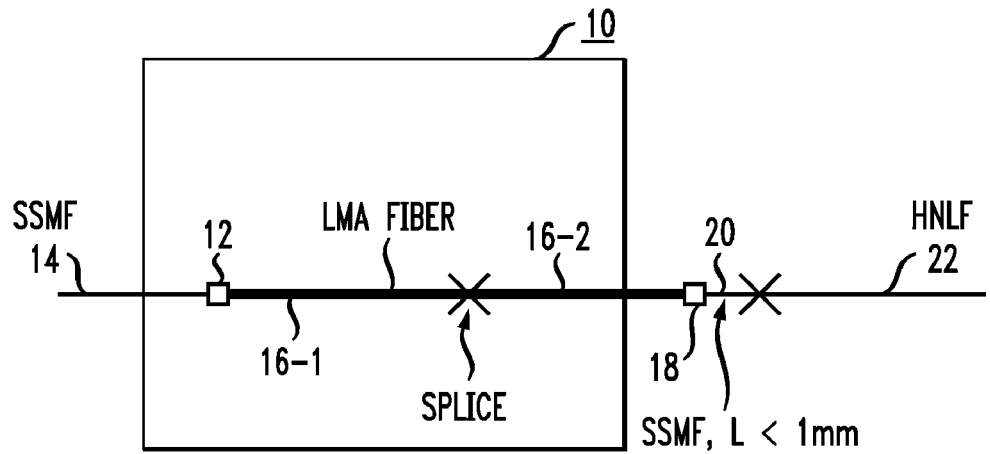
FIG. 8 illustrates an exemplary supercontinuum generating arrangement formed in accordance with the present invention.
Figure 9:
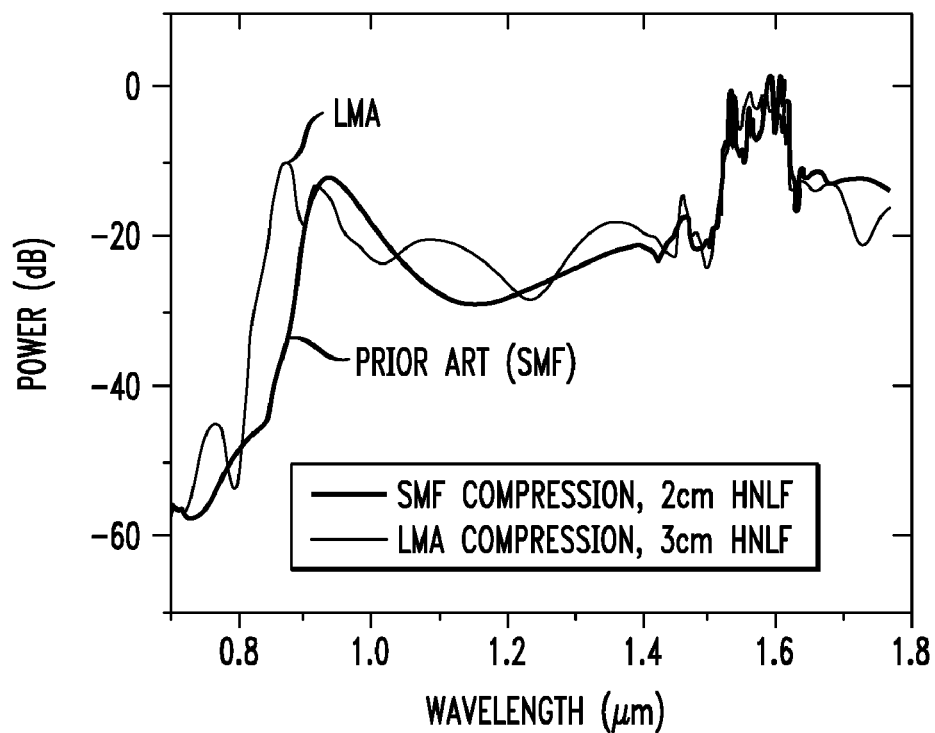
FIG. 9 contains plots of the continuum generated by the arrangement of FIG. 8, as compared to prior art-generated continuum.

FIG. 8 illustrates an exemplary supercontinuum generation system as formed in accordance with the present invention. In this particular arrangement, a section of highly-nonlinear fiber (HNLF) 22 is spliced to SMF 20, using the arrangement of FIG. 6. It is to be understood that in the alternative HNLF 22 may be directed fused to the endface of second GRIN fiber lens 18. Moreover, HNLF 22 may comprise a plurality of concatenated sections of fiber, each having different dispersion characteristics to provide a broad continuum. FIG. 9 contains plots of the generated continuum associated with the inventive arrangement of FIG. 8, as compared to a prior art continuum generation arrangement where the pulses are first compressed in a section of single mode fiber and then launched into a section of HNLF. From the spectra as shown, both pulse compression techniques produce very broad, smooth spectra in short lengths of HNLF. Other factors, such as the presence of noise along the spectra, cannot be ascertained from this measurement.

Figure 10:
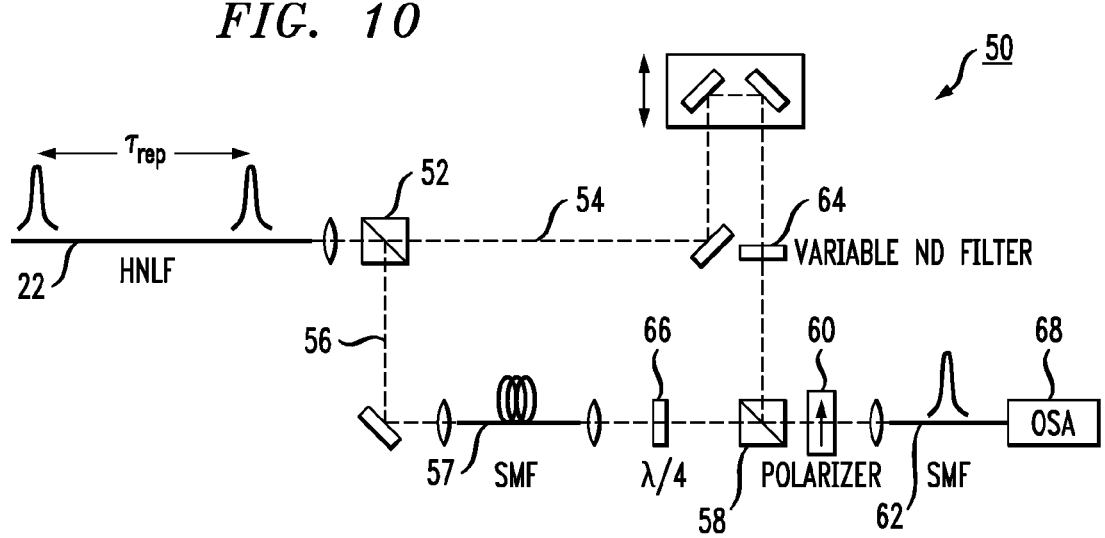
FIG. 10 shows an exemplary asymmetric interferometer arrangement that may be used to measure the cross-coherence associated with the continuum generated in the arrangement of the present invention as illustrated in FIG. 8.

Thus, in order to measure noise along the generated continuum, a cross-coherence measurement can be performed by interfering two independent continua and measuring the fringe contrast as a function of wavelength. FIG. 10 illustrates an exemplary asymmetric interferometer 50 that may be used to measure the cross-coherence associated with each of the generated continuum. Interferometer 50 receives as an input the continuum produced by a section of HNLF, such as HNLF 22 shown in FIG. 8. A beam splitter 52 is used to create two independent continua, a first continuum propagating along a first path 54 and a second continuum propagating along a second path 56. Interferometer 50 is 'asymmetric' by forming second path 56 to be unbalanced with respect to first path 54 by a length equal to the distance between pulses in the incoming pulse train, as shown. The pulses then overlap within a beam combiner 58 at the output and are passed through a polarizer 60 and coupled into a section of single mode fiber 62. The use of a polarizer at the output ensures polarization overlap, and the single mode fiber ensures modal overlap. A variable neutral density filter 64 is included along first signal path 52 and a quarter-wave plate 66 along second signal path 54 allow for power equalization between the two paths. An optical spectrum analyzer 68 is thereafter used to measure the fringe contrast at different wavelengths.

Figure 11:
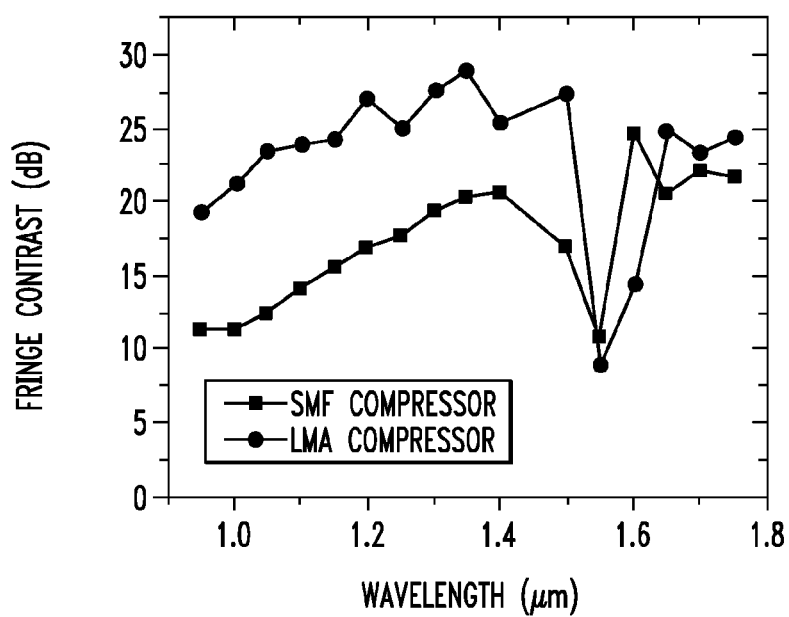
FIG. 11 contains plots of the cross-coherence measured in the arrangement of FIG. 10, one plot associated with the prior art SMF compression arrangement and the other associated with the all-fiber pulse compression arrangement of the present invention.

FIG. 11 shows the measured cross-coherence of the continua as plotted in FIG. 9. For perfectly coherent spectra, the fringe contrast will be equal to "1" (i.e., unity). Any degradation in coherence (as would be associated with the presence of noise in the generated supercontinuum) results in lowering the fringe contrast. FIG. 11 has plotted the fringe contrast on a dB scale to better show the difference in pulse compression between the prior art SMF pulse compression and the use of the GRIN lens/LMA combination of the present invention.

As shown in FIG. 9, continua from both the prior art and inventive compressors show very high coherence, as expected. However, by review of the data of FIG. 11, it is clear that the LMA compressor formed in accordance with the present invention shows a fringe contrast of almost 20 dB (0.99 fringe visibility on a linear scale) over a substantial portion of the wavelength range. In comparison, the pulses compressed using the prior art SMF arrangement show an almost 10 dB degradation in fringe contrast, and at one micron the fringe contrast on a linear scale is reduced from 0.99 to 0.92.

Although the present invention has been described in terms of the presently preferred embodiment, it is to be understood that such disclosure is not to be interpreted as limiting. Various alternatives and modifications will no doubt become apparent to those skilled in the art after reading the above disclosure. Accordingly, it is intended that the appended claims be interpreted as covering all alternatives and modifications as fall within the spirit and scope of the present invention.

What is claimed is:

1. An optical pulse compressor comprising:
   a first section of fiber exhibiting a first effective area $A_{eff-1}$ at an operating wavelength, said first section of fiber supporting the propagation of a chirped optical pulse;
   a graded-index fiber lens coupled to the output of the first section of fiber, wherein the graded-index fiber lens exhibits an approximately parabolic-shaped graded index profile; and
   a second section of fiber exhibiting a second effective area $A_{eff-2}$ at the operating wavelength, where $A_{eff-2} > A_{eff-1}$, and further exhibiting a dispersion D and a length L selected to compress the chirped optical pulse, said second section of fiber coupled to the output of the graded-index fiber lens, wherein the graded-index fiber lens provides mode matching between said first and second sections of fiber over a bandwidth of greater than 2 nanometers, the bandwidth is defined at full-width half-maximum.

2. An optical pulse compressor as defined in claim 1 wherein the graded-index fiber lens comprises a quarter-pitch fiber lens or any odd multiple thereof.

3. An optical pulse compressor as defined in claim 1 wherein the first section of fiber comprises a section of single mode fiber.

4. An optical pulse compressor as defined in claim 1 wherein the second section of fiber comprises a section of large-mode area (LMA) fiber.

5. An optical pulse compressor as defined in claim 1 wherein the dispersion, D, and length, L, of the second section of fiber are selected to produce a femtosecond optical pulse.

6. An optical pulse compressor as defined in claim 1 wherein the second section of fiber exhibits multi-path interference of less than −15 dB.

7. An optical pulse compressor as defined in claim 1 wherein the input of the graded-index fiber lens is fused to the output of the first section of fiber.

8. An optical pulse compressor as defined in claim 1 wherein the output of the graded-index fiber lens is fused to the input of the second section of fiber.

9. An optical pulse compressor as defined in claim 8 wherein the input of the graded-index fiber lens is fused to the output of the first section of fiber.

* * * * *